United States Patent
Cai et al.

(10) Patent No.: US 7,962,120 B2
(45) Date of Patent: Jun. 14, 2011

(54) ALLOCATION OF INTERNET PROTOCOL (IP) MULTIMEDIA SUBSYSTEM (IMS) CHARGES

(75) Inventors: Yigang Cai, Naperville, IL (US); Shiyan Hua, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 637 days.

(21) Appl. No.: 11/438,175

(22) Filed: May 22, 2006

(65) Prior Publication Data

US 2007/0270123 A1    Nov. 22, 2007

(51) Int. Cl.
   *H04M 11/00*    (2006.01)
(52) U.S. Cl. .................. 455/406; 455/405; 455/408
(58) Field of Classification Search ........... 455/405–409
   See application file for complete search history.

(56) References Cited

U.S. PATENT DOCUMENTS

| | | | |
|---|---|---|---|
| 6,023,499 A * | 2/2000 | Mansey et al. ............... 379/111 |
| 6,026,291 A * | 2/2000 | Carlsson et al. ............. 455/406 |
| 6,104,391 A * | 8/2000 | Johnston et al. ............. 715/745 |
| 6,282,274 B1 * | 8/2001 | Jain et al. ................. 379/114.26 |
| 6,463,275 B1 * | 10/2002 | Deakin ....................... 455/406 |
| 7,313,230 B2 * | 12/2007 | Lu et al. .................... 379/114.01 |
| 2003/0165222 A1 * | 9/2003 | Syrjala et al. ............ 379/114.26 |
| 2004/0029561 A1 * | 2/2004 | Holter et al. ................ 455/405 |
| 2004/0132427 A1 * | 7/2004 | Lee et al. ................... 455/406 |
| 2005/0069112 A1 * | 3/2005 | Hlasny ....................... 379/126 |
| 2006/0116105 A1 * | 6/2006 | Frankel et al. .............. 455/406 |
| 2007/0047711 A1 * | 3/2007 | Florkey et al. .............. 379/162 |
| 2007/0117586 A1 * | 5/2007 | Billmaier et al. ............ 455/552.1 |

* cited by examiner

*Primary Examiner* — Marisol Figueroa
(74) *Attorney, Agent, or Firm* — Werner Ulrich

(57) ABSTRACT

This invention relates to methods and apparatus for providing customized cost allocations for telecommunications session in an Internet Protocol Multimedia Subsystem (IMS) network. A Home Subscriber Service stores data describing the policies and rules for allocating charges requested by a particular customer. The charge message sent to charge control system is the product of the charges for the telecommunications session and the policies and rules for allocating charges. Advantageously, this arrangement permits each customer to specify a preferred charge allocation arrangement.

18 Claims, 2 Drawing Sheets

ALLOCATION OF INTERNET PROTOCOL (IP) MULTIMEDIA SUBSYSTEM (IMS) CHARGES

TECHNICAL FIELD

This invention relates to a method and apparatus for determining the allocation of charges in an Internet Protocol (IP) Multimedia Subsystem (IMS).

BACKGROUND OF THE INVENTION

The latest generation of telecommunications systems is based on the Internet Protocol (IP) Multimedia Subsystem (IMS) network. This network which carries many different kinds of medias, including voice, video, still picture, text, and data, will be used to provide advanced telecommunications services as well as such legacy services as voice. Signals for any service will be carried using the common IMS protocol.

It is apparent that a system having the great flexibility of IMS requires a highly sophisticated charging framework and protocol. That protocol is also being defined and is called Diameter. When a Session Initiation Protocol (SIP) session is initiated, the Diameter message to a Charging Collection Function (CCF) or Charging Data Function (CDF) is invoked. The CCF/CDF receives details of the session, including an identification of the parties involved in the session, and, based on this information, prepares the data necessary to charge the appropriate parties. The specifications for the Diameter system are presented in Document 3GPP TS 32.240 which is currently in Release 6. The document is issued by the 3GPP (3rd Generation Partnership Project) Organizational Partners.

A problem of the prior art is that while this document specifies a highly flexible arrangement, there are still some areas of flexibility which are missing.

Applicants are including a Glossary of the abbreviations encountered in this application at the end of the Detailed Description.

SUMMARY OF THE INVENTION

Applicants have carefully studied the specification documents and have recognized inventively that a significant area of flexibility is missing: namely, the flexibility to permit individual customers to specify customized cost allocation of charges to meet their needs. Applicants have solved this problem and contributed over the teachings of the prior art in accordance with this invention wherein the process of allocating charges for a telecommunications session include the process of accessing a customer database describing the customer's requested allocation rules and policies (sets of rules) for charging to different accounts, and allocating the costs of the session in accordance with these policies and rules; the accounts include prepaid and postpaid accounts, credit card accounts and bank accounts, as well as more conventional telecommunications bills. Advantageously, different types of communications to different parties can be charged to different accounts.

In accordance with one feature of Applicants' invention, a type of call, such as a personal call (not to be charged to the corporation which employs the caller), can be specified by a prefix or other signal at the time the telecommunications session is initiated. Advantageously, this permits a particular telecommunications session to be charged to a different account if, for example, a customer is making a personal call from a telecommunications device whose calls are normally charged to accounts of a business, or if the call charges are to be treated specially because of an unusual condition such as the correction of a mistake by the caller.

In accordance with Applicants' preferred embodiment, the charging policy/rule data for an IMS user is stored in a home subscriber server (HSS). A policy charging rule function of the IMS core network can retrieve a subscriber's charging policy rule and apply that rule to the subscriber's charging activities via a charging data function (CDF). When the CDF sends the charging data with the account identification to a charging gateway function (CGF), the CGF may then route the charging data records to Billing Mediation Device (BMD) or Billing System (BS) for charging data record correlation and billing invoice generation, or over a financial network to banks or credit card institutions to enter the charges to the user's account if the account is a bank account or a credit card. The CDF accesses a plurality of servers to obtain the data necessary to build up complete data charging messages.

The CGF accesses an on-line charging system (OCS) for calls whose charges must be calculated in real time. This is required for example to handle prepaid calls to ensure that the customer's balance in, for example, a prepaid charge account, is kept up to date and that calls are blocked if the customer's prepaid charge account balance would go negative if the call were completed; another example is for calls from hotel/motels where the charge must be immediately updated to prevent customers from leaving the hotel with unpaid telecommunications charges. The CGF also accesses a Billing Mediation Device (BMD) or Billing System (BS) for accumulating charges which are billed, for example, on a monthly basis from the telecommunications carrier.

All of the IMS network nodes involved in the communication session will send charging information via Diameter protocol to the CDF. The IMS network nodes including Call Session Control Function (I-Interrogating; P-Proxy; S-Serving) (CSCF); Breakout Gateway Control Function (BGCF); Media Gateway Control Function (MGCF); Media Resource Function Center (MRFC); Application Server (AS); Serving Support Node (SSN); and Gateway Support Node (GSN). The CDF collects, analyzes and consolidates the charging information from the IMS nodes and generates a Charging Data Record (CDR) per node per session.

In accordance with one feature of Applicants' invention, the policy can be made time sensitive so that a different policy can, for example, be used during business hours and during off hours or weekends.

In accordance with another feature of Applicants' invention, the charging policy can be made sensitive to the geographic location of the call destination. This can be especially useful for international calls.

In case of a conflict among two or more policies, for example, between time period and geographic location policies, an ordered priority for the policies will determine which policy prevails.

In accordance with Applicants' preferred embodiment, the Diameter protocol is used for transporting the user's charging policy data from and to the HSS.

DETAILED DESCRIPTION

Figure 1:
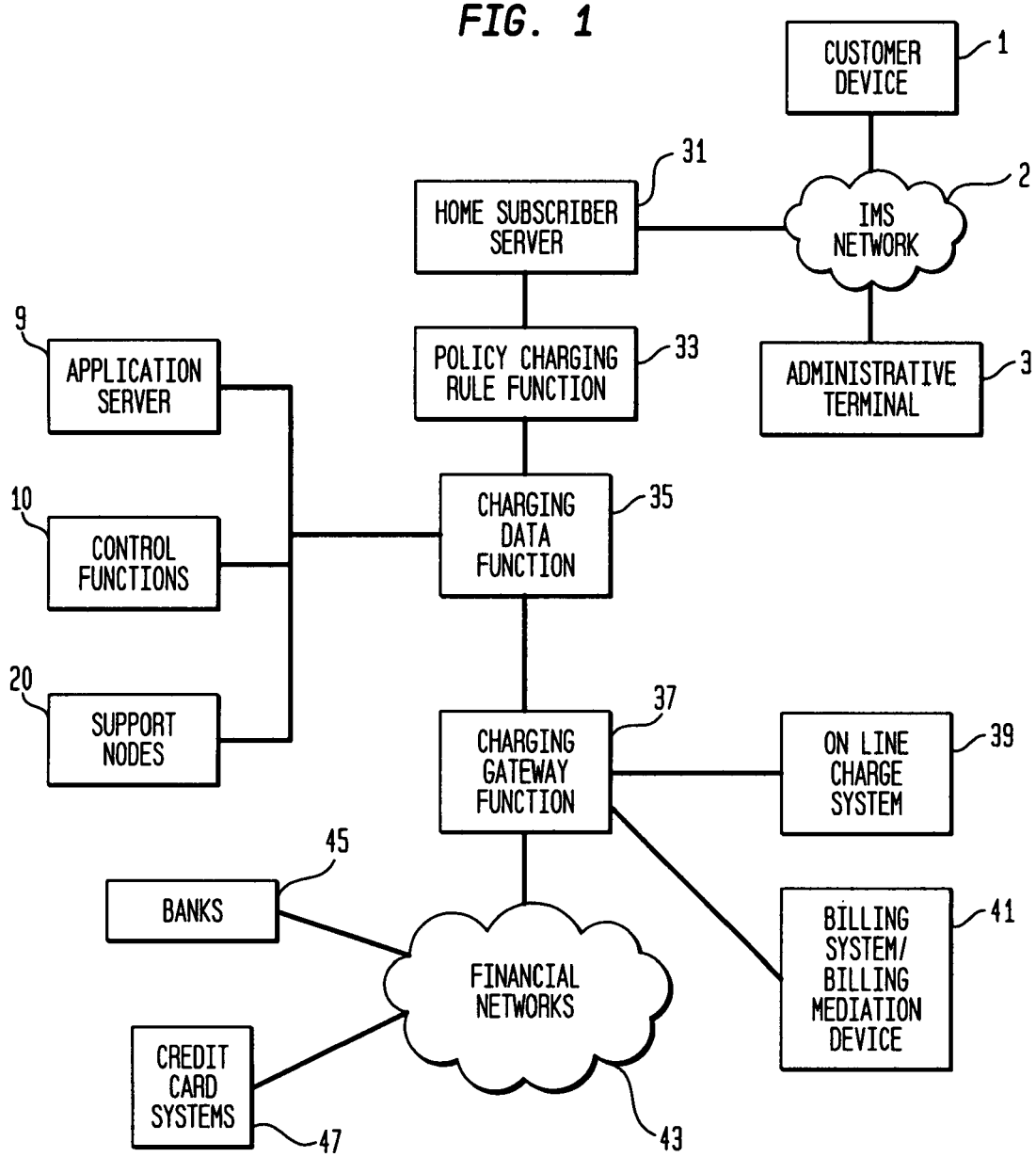
FIG. 1 is a block diagram illustrating the operation of Applicants' invention.

FIG. 1 is a block diagram illustrating the operation of Applicants' invention. A customer device 1 is connected to the IMS network 2. The connection can be land based or it can be a cellular radio connection. The customer device can be, for example, a cellular station, a personal digital assistant, a personal computer, a TV transmitter/receiver.

When a customer originates a call, the IMS network sends a message to a serving call session control function (S-CSCF), one of the control functions in block 10, giving the details of the telecommunications session being initiated. These details would include the calling and called terminal identifications (or more in case of a conference call), the time of the beginning of the call, the type of signals being transmitted (voice, data, text, video, still picture) and the bandwidth being used for services such as video which do not have a standard bandwidth requirement. The control function passes this information to the charging data function (CDF) 35 which is responsible for building up a charging data record. The charging data record is sent to the CGF for subsequent transmission to the on-line charging system 39, or the billing system 41, or, for calls charged to a bank account or credit card, to financial network 43 for distribution to a credit card corporation or bank.

In parallel, when a customer registers on the network, the network informs the home subscriber server (HSS) 31 that the calling subscriber has initiated a telecommunications session. A policy charging rule function (PCRF) 33 requests the calling customer policy data from the HSS. The PCRF then processes information about individual call sessions received from the charging data function with the policy/rule data received from the HSS and generates the information necessary to create a charging data message and passes this information to the charging data function (CDF). The CDF 35 generates the charging data record (CDR), then passes the charging data record (CDR) to the charging gateway function (CGF) 37 which passes the information to the on-line charging system 39 for services requiring real time charging, or to the billing system/billing mediation device 41 for accumulating charges to be sent to the customer within a periodic such as monthly bill; for cases in which the charges are to be taken from a bank account 45 or a credit card 47, the CGF 37 sends the charging message to a financial network 43 for distribution to a credit card corporation or a bank. A billing mediation device can collect a call data record for consolidation, reformatting and correlation with other call data records; a billing system performs these functions but in addition calculates costs and generates billing invoice data.

According to the principles of Applicants' invention, each IMS subscriber/user can have the following IMS charging policies information stored in the home subscriber server 31:

a list of IMS activity policy data that associates an IMS activity and a corresponding account such as the following: an IMS activity data that can have a choice among voice sessions, data sessions, video sessions, and instant message sessions.

Corresponding account data can further specify account type data that can have choices such as bank account, credit card account, postpaid phone account, and prepaid account (associated, for example, with a prepaid card, or a subscriber identification such as a mobile phone number). If the account type is a bank account then the bank account routing number and bank account number is provided. If the account type is credit card then a choice among Visa, MasterCard, Discover, AMEX, . . . , and the credit card number are specified. For postpaid phone accounts, the account type and number and for prepaid accounts the prepaid card number or mobile identification number are specified.

Also provided for each IMS subscriber/user is a list of originating identification policies including such factors as the originator or calling party, list of public user IDs such as a list of directory numbers for identifying calling and called parties or a list of network realms.

The data may also include a list of originator location policies that associates originator location and a corresponding account.

The data may also include a list of time period policies that associates time period and a corresponding account. Time period data may have a start time data and an end time data for each different time period policy.

An IMS user can have a plurality of charging policies with a priority for each policy such that the highest priority policy is invoked.

For example, a customer may request charging all calls made from 5:00 p.m. to midnight to a prepaid account (policy 1), and calls made from a particular station, the customer's home station to the customer's credit card (policy 2). Policy 1 has a higher priority than policy 2. Then, if the customer makes a call from his/her home station at 8:00 p.m., the call will be charged to the prepaid account.

The customer data stored in the HSS 30 can be modified under the control of an administrative terminal 3, connected to the network 2, or under the control of the customer terminal 1.

Figure 2:
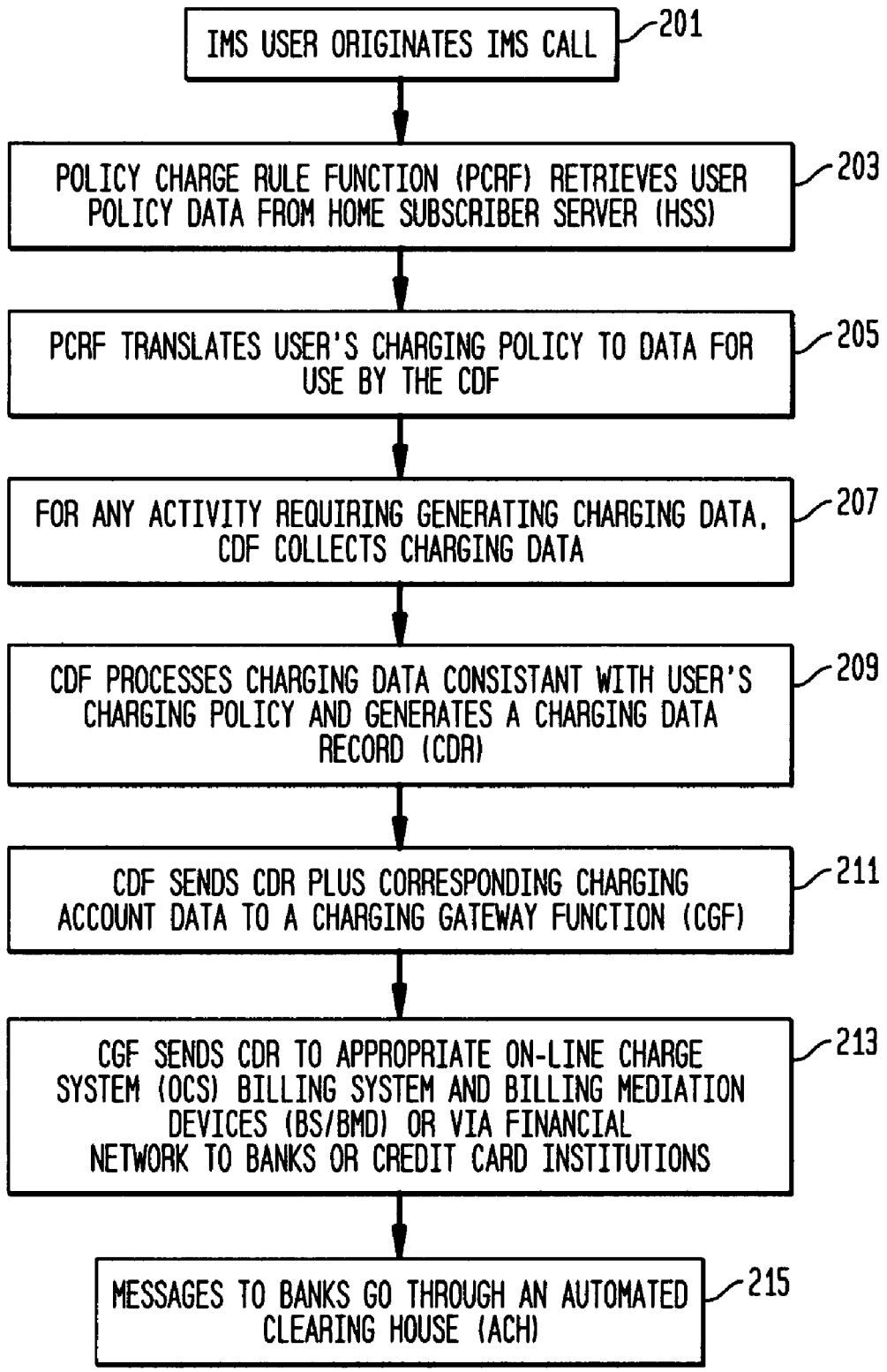
FIG. 2 is a flow diagram illustrating the operation of Applicants' invention.

FIG. 2 is a flow diagram illustrating the processing of charging in accordance with Applicants' invention. An IMS user registers on the IMS and originates an IMS call (action block 201). The PCRF retrieves the user policy data for the originating user from the home subscriber server (action block 203). The PCRF interprets the policy data received from the HSS in light of the type of call being originated by the originator on the IMS (action block 205). The PCRF translates the user's charging policy to data for use by the charge data function (CDF). The primary responsibility for generating charging data records is with the charging data function (action block 207). The CDF processes charging data consistent with the user's charging policy and generates a charging data record (CDR) (action block 209). The CDF sends a CDR plus the corresponding charging account data to a charging gateway function (CGF) (action block 211). The charging gateway function collects data and distributes data such as the charging data records to on-line charge systems, billing systems, banks and via a billing systems and billing mediation devices (BS/BMD) or via a financial network to banks or credit card institutions (action block 213). The BMD and the BS consolidate and correlate CDRs. The BSs also rate each call using a build-in Rating Engine or external Rating engine. The BSs also generate periodic billing invoices. For hotel calls, the BS generates a near real-time invoice. The on-line charging system deducts a charging amount from subscriber's prepaid account; bank or credit account data is sent by an automated clearing house to clear for electronic payments for corresponding charging amounts; for postpaid charging accounts, the call data record is routed to a billing system or a billing mediation device which generates invoices on a monthly basis (action block 213).

The above description is of one preferred embodiment of Applicants' invention. Other embodiments will be apparent to those of ordinary skill in the art. The invention is limited only by the attached claims.

| GLOSSARY | |
|---|---|
| 3GPP | 3rd Generation Partnership Project |
| AS | Application Server |
| BMD | Billing Mediation Device |
| BS | Billing System |
| CCF | Charging Collection Function |
| CDF | Charging Data Function |
| CDR | Charging Data Record |
| CGF | Charging Gateway Function |
| CSCF | Call Session Control Function (I-Interrogating; P-Proxy; S-Serving) |
| GSN | Gateway Support Node |
| HSS | Home Subscriber Server |
| IMS | Internet Protocol (IP) Multimedia Subsystem |
| IP | Internet Protocol |
| MGCF | Media Gateway Control Function |
| MRCF | Media Resource Function Center |
| OCS | On-line charging system |
| PCRF | Policy Charging Rule Function |
| S-CSCF | Serving Call Session Control Function |
| SSN | Serving Support Node |
| SIP | Session Initiation Protocol |

We claim:

1. A method of charging for a telecommunications session on an Internet Protocol Multimedia Subsystem (IMS) network from a calling customer to a called customer comprising the steps of:

storing charge allocation data for allocating telecommunications charges to ones of a plurality of different accounts of said calling customer in a home subscriber server (HSS);

transmitting from said IMS for serving said telecommunications session to said HSS information regarding said telecommunications session in said IMS network;

accessing said HSS to obtain the calling customer charge allocation data;

transmitting from said HSS to a charging data function unit, for allocating charges for said telecommunications session to specified ones of a plurality of different accounts of said calling customer, said information regarding said telecommunications session and said charge allocation data;

in said charging data function unit, allocating charges for said telecommunications session to ones of said plurality of accounts in accordance with said charge allocation data;

transmitting the allocated charging data from said charging data function unit to a charging gateway function;

said charging gateway function for routing said allocated charging data to a telecommunications billing system for accumulating billing charges for ones of said plurality of accounts for said calling customer or to a financial network for routing said charging data to ones of a plurality of financial institutions.

2. The method of claim 1 wherein said financial network accesses ones of a bank account, a credit card account, a postpaid account, or a prepaid account.

3. The method of claim 1 wherein said calling customer charge allocation data comprise rules for ones of voice sessions, data sessions, video sessions, instant message sessions, locations, time periods, calling customers, and called customers.

4. The method of claim 3 wherein said calling customer and called customer are identified by public user identifications.

5. The method of claim 1 wherein said calling customer charge allocation data are a function of the geographic location of the calling customer.

6. The method of claim 1 wherein said calling customer charge allocation data are a function of whether said calling customer is calling from a cellular station.

7. The method of claim 1 wherein said calling customer charge allocation data are a function of whether said calling customer is calling over a WiFi connection.

8. The method of claim 1 wherein said calling customer charge allocation data are a function of time of day or day of week.

9. The method of claim 1 wherein said calling customer charge allocation data include multiple rules and a priority for each rule.

10. Apparatus for charging for a telecommunications session on an Internet Protocol Multimedia Subsystem (IMS) network from a calling customer to a called customer comprising:

a home subscriber server (HSS) for storing charge allocation data for allocating telecommunications charges to ones of a plurality of different accounts of said calling customer;

means for transmitting from said IMS for serving said telecommunications session to said HSS information regarding said telecommunications session in said IMS network;

means for accessing said HSS to obtain the calling customer telecommunications charge allocation data;

a charging data function unit for allocating charges for said telecommunications session to specified ones of a plurality of different accounts in accordance with said charge allocation data;

means for transmitting from said HSS to said charging data function unit said information regarding said telecommunications session and said calling customer charge allocation data;

in said charging data function unit, means for allocating charging data for said telecommunications session to ones of a plurality of accounts in accordance with said charge allocation data;

a charging gateway function for receiving the allocated charging data from said charging data function unit;

said charging gateway function for routing said allocated charging data to a telecommunications billing system for accumulating billing charges for ones of said plurality of accounts for said calling customer or to a financial network for routing said charging data to ones of a plurality of financial institutions.

11. The apparatus of claim 10 wherein said financial network accesses ones of means for allocating charges to a bank account, a credit card account, a postpaid account, or a prepaid account.

12. The apparatus of claim 10 wherein said calling customer charge allocation data comprise rules for ones of voice sessions, data sessions, video sessions, instant message sessions, locations, time periods, calling customers, and called customers.

13. The apparatus of claim 12 wherein said calling customer and called customer are identified by public user identifications.

14. The apparatus of claim 10 wherein said calling customer charge allocation data are a function of the geographic location of the calling customer.

15. The apparatus of claim 10 wherein said calling customer charge allocation data are a function of whether said calling customer is calling from a cellular station.

16. The apparatus of claim 10 wherein said calling customer charge allocation data are a function of whether said calling customer is calling over a WiFi connection.

17. The apparatus of claim 10 wherein said calling customer charge allocation data are a function of time of day or day of week.

18. The apparatus of claim 10 wherein said calling customer charge allocation data include multiple rules and a priority for each rule.

* * * * *